United States Patent
Steiner et al.

(10) Patent No.: US 11,132,876 B1
(45) Date of Patent: Sep. 28, 2021

(54) SYSTEMS AND METHODS OF USING MULTIPLE RFID DEVICES TO IMPLEMENT IN-STORE POINT-OF-SALE BUY-ZONES AND RELATED ARTICLES OF MANUFACTURE

(71) Applicant: Toshiba Global Commerce Solutions Holdings Corporation, Tokyo (JP)

(72) Inventors: David Steiner, Durham, NC (US); Kimberly A. Wood, Raleigh, NC (US); Timothy Wayne Crockett, Raleigh, NC (US); Jose Figueroa, McDonough, NC (US)

(73) Assignee: Toshiba Global Commerce Solutions Holdings Corporation

( * ) Notice: Subject to any disclaimer, the term of this patent is extended or adjusted under 35 U.S.C. 154(b) by 0 days.

(21) Appl. No.: 16/885,829

(22) Filed: May 28, 2020

(51) Int. Cl.
  *G07G 1/00* (2006.01)
  *G06Q 20/20* (2012.01)
(52) U.S. Cl.
  CPC ......... *G07G 1/0045* (2013.01); *G06Q 20/208* (2013.01)
(58) Field of Classification Search
  CPC ..................... G07G 1/0045; G06Q 20/208
  See application file for complete search history.

(56) References Cited

U.S. PATENT DOCUMENTS

| | | | |
|---|---|---|---|
| 6,903,656 B1 | 6/2005 | Lee | |
| 7,817,014 B2 | 10/2010 | Krishna et al. | |
| 9,116,237 B2 | 8/2015 | Zhou et al. | |
| 9,373,012 B2* | 6/2016 | Pesavento | G06K 7/10178 |
| 10,043,119 B1* | 8/2018 | Egan | G08B 13/24 |
| 10,467,609 B2* | 11/2019 | Clark | G06Q 10/087 |
| 2011/0090059 A1* | 4/2011 | Sadr | G01S 7/023 340/10.1 |

(Continued)

FOREIGN PATENT DOCUMENTS

EP  3444744 A1  2/2019

OTHER PUBLICATIONS

P. Parthiban, B. Seet and X. J. Ii, "Scalable Near-field Fed Far-field UHF RFID Reader Antenna for Retail Checkout Counters," 2019 IEEE International Conference on Rfid (RFID), Phoenix, AZ, USA, 2019, pp. 1-6. (Year: 2019).*

(Continued)

*Primary Examiner* — Nathan A Mitchell
(74) *Attorney, Agent, or Firm* — Stanek Lemon Crouse & Meeks, P.A.

(57) ABSTRACT

An RFID in-store point-of-sale system can include a first RFID tag reader with a first reader antenna that extends on a first substrate oriented in a first plane; and a second RFID tag reader with a second reader antenna that extends on a second substrate oriented in a second plane that intersects the first plane to form an offset angle between the first plane and the second plane that is about 45 degrees to about 135 degrees. A processor circuit can be operatively coupled to the first RFID tag reader and to the second RFID tag reader and can be configured to control the first RFID tag reader to transmit a signal from the first reader antenna into a buy-zone and is configured to detect movement of an RFID tag relative to the buy-zone based on a signal from the RFID tag that is detected by the first RFID tag reader or that is detected by the second RFID tag reader.

20 Claims, 11 Drawing Sheets

(56) References Cited

U.S. PATENT DOCUMENTS

| | | | | |
|---|---|---|---|---|
| 2012/0161930 A1* | 6/2012 | Subramanian | ..... | G06K 7/10108 340/10.1 |
| 2014/0111311 A1* | 4/2014 | Koch | ................... | G06K 7/0008 340/10.5 |
| 2014/0159869 A1* | 6/2014 | Zumsteg | ................ | G07G 1/009 340/10.1 |
| 2015/0102908 A1* | 4/2015 | Griesmann | ........ | G06K 7/10198 340/10.1 |
| 2018/0247092 A1* | 8/2018 | Khojastepour | ......... | G01S 11/06 |
| 2018/0336380 A1* | 11/2018 | Jones | ................. | G06K 7/10108 |
| 2019/0028861 A1* | 1/2019 | Lewis | .................... | H04W 4/35 |
| 2019/0034673 A1* | 1/2019 | Koch | ................. | G06K 7/10099 |
| 2020/0226331 A1* | 7/2020 | Khojastepour | .... | G06K 7/10029 |

OTHER PUBLICATIONS

R. Kronberger, T. Knie, R. Leonardi, U. Dettmar, M. Cremerand S. Azzouzi, "UHF RFID localization system based on a phased array antenna," 2011 IEEE International Symposium on Antennas and Propagation (APSURSI), Spokane, WA, USA, 2011, pp. 525-528. (Year: 2011).*

M. Scherhäufl, M. Pichler and A. Stelzer, "UHF RFID Localization Based on Phase Evaluation of Passive Tag Arrays," in IEEE Transactions on Instrumentation and Measurement, vol. 64, No. 4, pp. 913-922, Apr. 2015. (Year: 2015).*

\* cited by examiner

SYSTEMS AND METHODS OF USING MULTIPLE RFID DEVICES TO IMPLEMENT IN-STORE POINT-OF-SALE BUY-ZONES AND RELATED ARTICLES OF MANUFACTURE

FIELD

The present invention relates to the field of RFID systems in general, and more particularly, RFID systems for use with point of sale systems.

BACKGROUND

Self-checkout systems are commonly used by consumers at retail locations such as grocery stores. Typical radio frequency identification (RFID) tags or RF tags include a microprocessor functionally connected to an antenna. The microprocessor stores and processes relevant data that may include unique data for identifying a specific item associated with the RF tag. The microprocessor also modulates a radio frequency (RF) signal that is transmitted or backscattered via the antenna. An external tag reader captures the data signal transmitted by the RF tag.

In some cases, the external tag reader may be configured to determine the distance between the reader and the RF tag. Conventional ranging techniques, such as received signal strength (RSS) for either active or passive RF tags, work over relatively large areas but suffer from poor accuracy. Time of flight or frequency modulated continuous wave radar may also be used to determine the separation distance but these techniques work poorly for short distance applications because of the difficulties of measuring the small round trip time or frequency delay. Instead RF phase-based ranging techniques may offer better accuracy.

SUMMARY

Embodiments according to the present invention can provide systems and methods of using multiple RFID devices to implement in-store point-of-sale zones and related articles of manufacture. Pursuant to these embodiments, an RFID in-store point-of-sale system can include a first RFID tag reader with a first reader antenna that extends on a first substrate oriented in a first plane; and a second RFID tag reader with a second reader antenna that extends on a second substrate oriented in a second plane that intersects the first plane to form an offset angle between the first plane and the second plane that is about 45 degrees to about 135 degrees. A processor circuit can be operatively coupled to the first RFID tag reader and to the second RFID tag reader and can be configured to control the first RFID tag reader to transmit a signal from the first reader antenna into a buy-zone and is configured to detect movement of an RFID tag relative to the buy-zone based on a signal from the RFID tag that is detected by the first RFID tag reader or that is detected by the second RFID tag reader.

In some embodiments according to the invention, a method of operating an RFID in-store point-of-sale system can be provided by (a) transmitting a first signal from a first RFID tag reader into a buy-zone via a first reader antenna that extends in a first plane, (b) determining whether a first signal transmitted by an RFID tag moving relative to the buy-zone is received at the first RFID tag reader in response to the first signal transmitted from the first RFID tag reader, (c) determining whether a second signal transmitted by the RFID tag moving relative to the buy-zone is received at a second RFID tag reader via a second reader antenna that extends in a second plane, the second plane intersecting the first plane to form an offset angle between the first plane and the second plane that is about 45 degrees to about 90 degrees, repeating operations (a)-(c) until detecting a movement of the RFID tag into the buy-zone or out of the buy-zone based on receiving the first signal from the RFID tag or receiving the second signal from the RFID tag, and indicating that an item associated with the RFID tag has been purchased or not been purchased responsive to detecting the movement of the RFID tag into the buy-zone or out of the buy-zone, respectively.

In some embodiments according to the invention, one or more non-transitory processor-readable media storing processor-executable instructions for causing one or more processors to perform a method of operating a RFID in-store point-of-sale system can be provided by (a) transmitting a first signal from a first RFID tag reader into a buy-zone via a first reader antenna that extends in a first plane, (b) determining whether a first signal transmitted by an RFID tag moving relative to the buy-zone is received at the first RFID tag reader in response to the first signal transmitted from the first RFID tag reader, (c) determining whether a second signal transmitted by the RFID tag moving relative to buy-zone is received at a second RFID tag reader via a second reader antenna that extends in a second plane, the second plane intersecting the first plane to form an offset angle between the first plane and the second plane that is about 45 degrees to about 90 degrees, repeating operations (a)-(c) until detecting a movement of the RFID tag into the buy-zone or out of the buy-zone based on receiving the first signal from the RFID tag or receiving the second signal from the RFID tag, and indicating that an item associated with the RFID tag has been purchased or has not been purchased responsive to detecting the movement of the RFID tag.

DETAILED DESCRIPTION OF EMBODIMENTS ACCORDING TO THE INVENTION

Figure 1A:
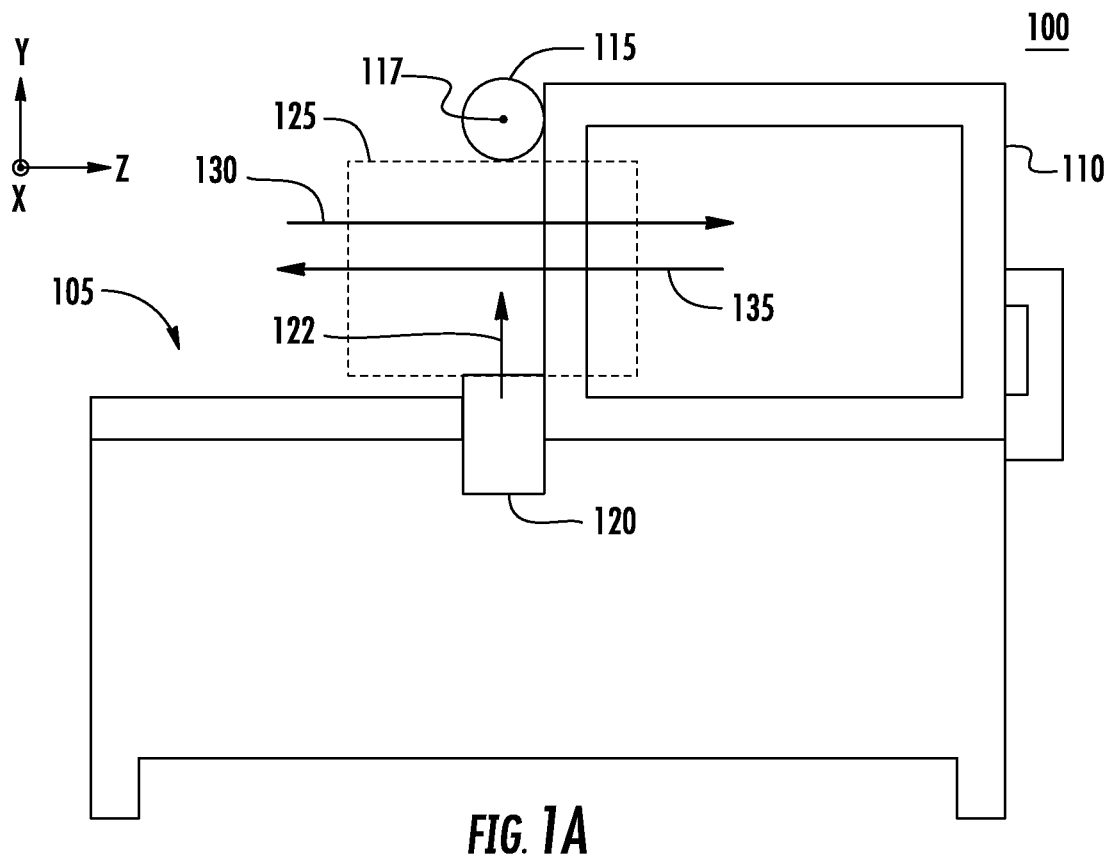
FIG. 1A is a front view of a Point Of Sale (POS) system including two RFID devices oriented in different planes relative to one another and configured to detect RFID tagged items moving relative to a defined buy-zone with varied orientations in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, multiple RFID tag readers placed in different planes relative to one another may increase the likelihood that RFID tags attached to items can be detected in a "buy-zone" despite the tag being improperly oriented or being obscured by another RFID tag or items (sometimes referred to as "shadowing"). In a self-checkout embodiment for example, the shopper can move an RFID tagged item through the buy-zone that is adjacent to a bagging station as a way to signal that the shopper wishes to purchase the item. The RFID tag readers can be used to determine the distance from the readers to the tagged item as a way to detect whether the item is moving through the buy-zone. Moreover, deploying multiple tag readers in different planes may improve the continuous tracking of the item even if the orientation of the item changes while passing thorough the buy-zone.

In some conventional approaches, if an RFID tag is not oriented correctly relative to the RFID tag reader, the tag may not receive a signal from the reader or even if the transmission is received by the tag, the response from the tag may not be directed to the reader. As appreciated by the present inventors, however, placing the RFID tag readers in different planes relative to one another can increase the probability that an RFID tag will be correctly oriented relative to at least one of the tag readers. In some embodiments according to the invention, the selected planes form an angle of about 45 degrees to about 90 degrees. In some embodiments, more than two tag readers may be used. Similarly, placing multiple RFID tag readers in different planes relative to one another can increase the probability that an RFID tag that is shadowed by another RFID tag, for example, may be unobscured relative to at least one of the other RFID tag readers.

In some embodiments according to the invention, the system can include two RFID tag readers placed in different planes, where each reader can both transmit signals to RFID tags and receive signals from the RFID tags, in response. In this type of arrangement, transmission of signals from the RFID tag readers can alternate to reduce the likelihood that the signals from the different RFID tag readers are received by the RFID tag at about the same time.

In some embodiments according to the invention, the system can include two RFID tag readers placed in different planes, where one reader can both transmit signals to RFID tags and receive signals from the RFID tags, in response. In contrast, the other RFID tag reader may be a receive-only device which does not transmit signals to the RFID tags. In both type of arrangements, the RFID tag readers may be oriented so that the tag readers form an angle of about 45 degrees to about 90 degrees. It will be understood that the plane for an RFID reader may be defined relative to a substrate that supports the RFID tag reader antenna. For example, the antenna for the RFID tag reader may be printed on a non-conductive substrate to define the direction in which the RFID tag reader transmits and receives signals.

In some embodiments according to the invention, the buy-zone can be defined relative to any area where consumers make decisions regarding purchasing items. For example, the buy-zone can be defined to be at the SCO terminal or adjacent to a shelf on which items are displayed.

The system can detect the movement of the RFID tagged item moving in a particular direction that indicates the purchase. For example, moving the item through the buy-zone toward an area that is designated to hold purchases, such as a bagging station, wheeled shopping cart, or hand-held shopping basket, can be interpreted as a desire to purchase the item. If, however an already purchased item is moved through the buy-zone away from area that is designated to hold purchases, the item may be removed from the shoppers purchases. It will be further understood that the buy-zone may be defined to be other areas, such as adjacent to a shelf on which the items are offered for sale.

Figure 1B:
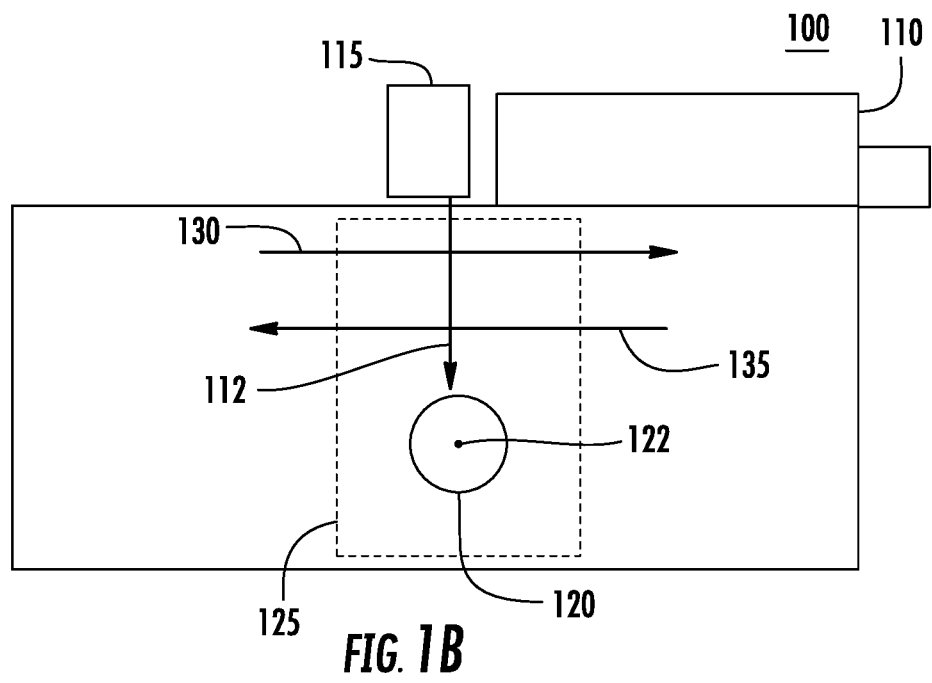
FIG. 1B is a top view of the POS system shown in FIG. 1A.
Figure 1C:
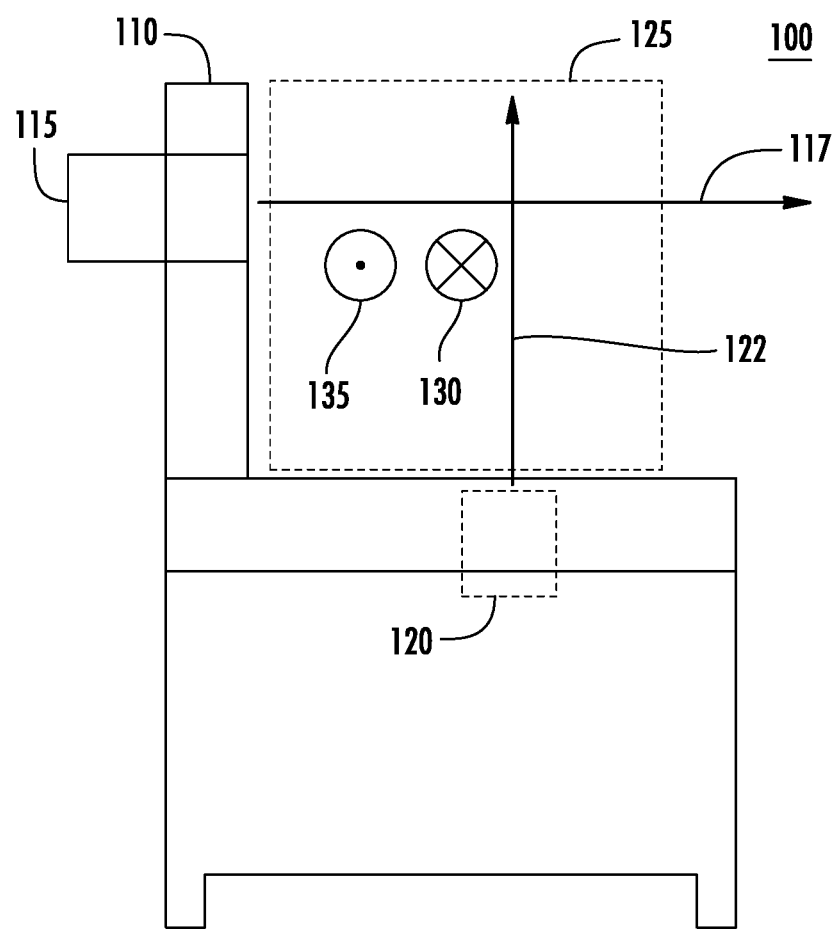
FIG. 1C is a side view of the POS system shown in FIG. 1A.

FIG. 1A is a front view of a Point Of Sale (POS) system 100 including two RFID devices 115, 120 oriented in different planes relative to one another and configured to detect RFID tagged items moving relative to a defined buy-zone with varied orientations in some embodiments according to the invention. FIG. 1B is a top view of the POS system shown in FIG. 1A. FIG. 1C is a side view of the POS system shown in FIG. 1A.

According to FIG. 1, the system 100 includes a POS terminal 110 that can include hardware and software that enables operations of the RFID POS system 100 as described herein, such as a processor circuit. A bagging station 105 is located adjacent to the POS terminal 110 and is an area designated to indicate the purchasing of items using the POS system 100. Shoppers can purchase items by passing the items through a buy-zone 125 in a direction 130 toward the bagging station 105. Alternatively, if a shopper wishes to remove an already purchased item, the item can be passed through the buy-zone 125 in a direction 135 away from the bagging station 105 (opposite direction 130).

The buy-zone is monitored by a first RFID tag reader 115 and a second RFID tag reader 120, which are oriented in different planes to increase the likelihood that items passing though the buy-zone 125 with varying orientations (or partially obscured by other objects) are read correctly. In particular, the first RFID tag reader 115 is located in the x-y plane whereas the second RFID tag reader 120 is located in the x-z plane. The first RFID tag reader 115 is configured to have a scan direction 117 whereas the second RFID tag reader 120 is configured to have a scan direction 122. Accordingly, the planes of orientation of the first and second RFID tag readers 115, 120 form an angle of about 90 degrees. In other embodiments, the angle can range from between about 45 degrees to about 90 degrees. In still other embodiments, the orientation of the RFID tag readers can be adjusted to vary the angle. In still further embodiments, the system 100 can include more than two RFID tag readers where each pair of RFID tag readers can form an angle from between about 45 degrees to about 90 degrees.

The movement of the tagged items relative to the buy-zone 125 can be determined by measuring a distance from an RFID tag reader and the RFID tagged item. The distance can be used to determine whether the tagged item is moving through the buy-zone 125, which is a three-dimensional space that includes points that are pre-defined distances to the RFID tag readers (so that the points are included in the buy-zone 125). In this way, the tag readers can detect items for purchase (or removal) by monitoring only items that are located with the specific three dimensional space that defines the buy-zone 125. Items which are determined to be too distant from the RFID tag readers to be moving through the buy zone 125, can be ignored. The distance from the RFID tag readers 115, 120 to the RFID tagged items can be determined using phase information that is associated with signals that are communicated between the tag reader and the RFID tagged item, as described for example in U.S. Pat. No. 9,116,237, to Zhou et al, the entire disclosure of which is hereby incorporated herein by reference.

Figure 2:
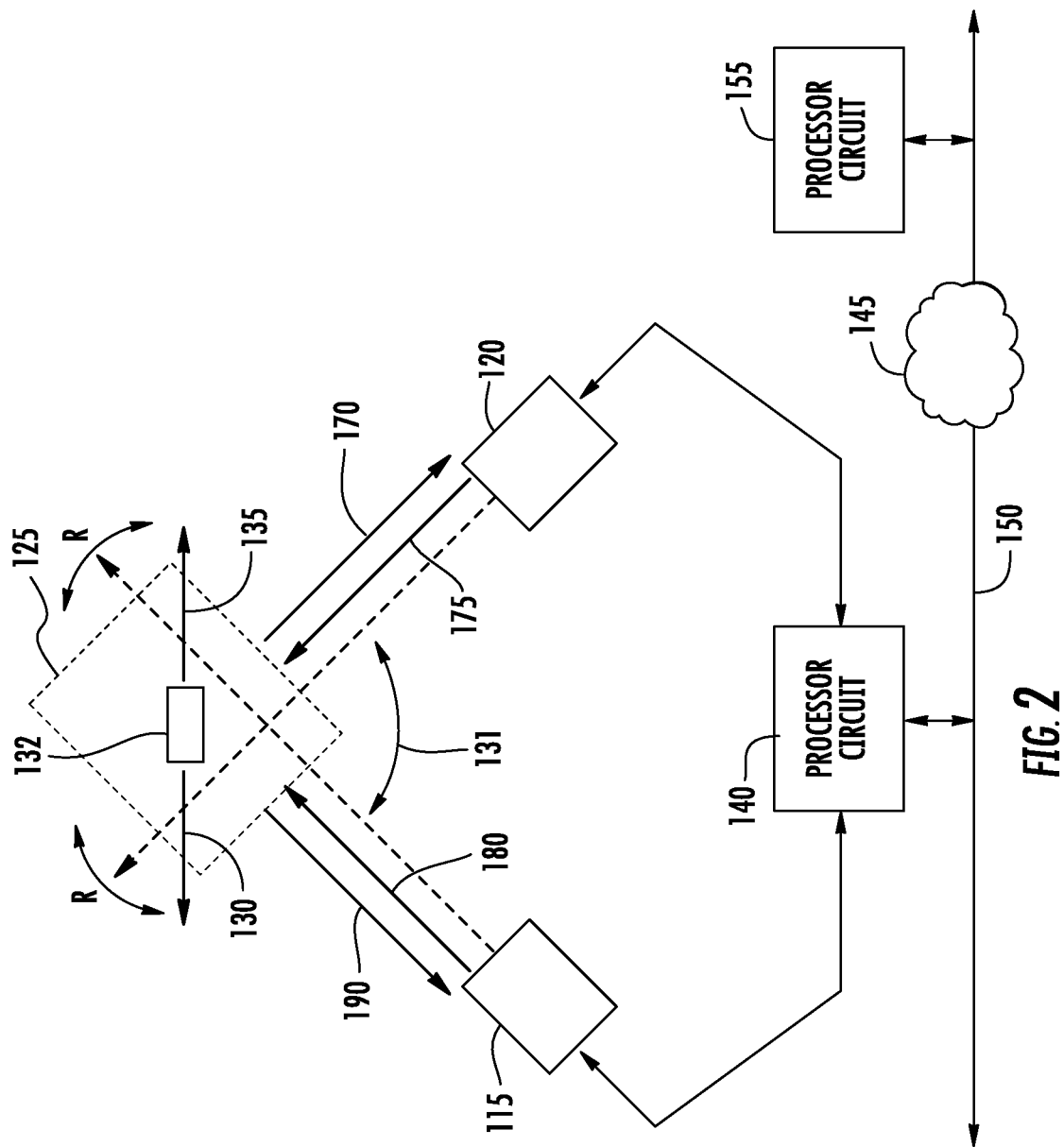
FIG. 2 is a schematic diagram of the POS system shown in FIG. 1 illustrating the orientation of two transmit/receive RFID tag readers to define the buy-zone in which RFID tagged items can be moved for purchase in some embodiments according to the invention.

FIG. 2 is a schematic diagram of the POS system shown 100 in FIG. 1 illustrating the orientation of two transmit/receive RFID tag readers 115, 120 to define the buy-zone 125 in which RFID tagged items 132 can be moved for purchase in some embodiments according to the invention. According to FIG. 2, the two transmit/receive RFID tag readers 115, 120 are oriented in different planes to form an angle 131 that is about 90 degrees in some embodiments. The RFID tagged items 132 can be moved in the direction 135 through the buy-zone 125 toward the bagging station 105 or away from the bagging station 105 in direction 130.

As further shown in FIG. 2 each of the RFID tag readers 115, 120 has an associated radius R which is within the operational scanning range of the respective reader. In particular, the radius R is a distance within which if an RFID tag receives a read signal from the RFID tag reader, the RFID tag will transmit a response to the read signal. The buy-zone 125 can be defined to include points in the respective three dimensional spaces that overlap another. It will be understood that even though points in space may be within scanning range R of the RFID tag reader, those points may not be included in the buy-zone 125.

In operation, the RFID tag reader 120 can transmit a read signal 175 which is received by the RFID tagged item 132 because it is within range R. After receiving the read signal 175, the RFIID tagged item 132 can respond by transmitting a response signal 170 back to the RFID tag reader 120. The system 100 can delay the operation of the RFID tag reader 115 to insure the existence of a time interval before the RFID tag reader 115 transmits a read signal 180. The time interval is inserted to insure that there is no conflict between the read signal 175 and the read signal 180 at the RFID tagged item 132. After receiving the read signal 180, the RFIID tagged item 132 can respond by transmitting a response signal 190 back to the RFID tag reader 115.

The information associated with the response signals 170 and 190 are transmitted to a processor circuit 140, which is configured to coordinate operations of the system 100. In particular, the processor circuit 140 is configured to determine whether the RFID tagged item 132 is located within the buy-zone 125 using the phase information derived from the response signals 175 and 190. If the processor circuit 140 determines that the RFID tagged item 132 is located within the buy-zone 125, the processor circuit can determine whether the RFID tagged item 132 is moving toward the bagging area 105 or away from the bagging area based on changes in the position of the RFID tagged item 132 over time. The processor circuit 140 can then update the list of purchased items for the shopper. The processor circuit 140 can be included in the POS system 100 or can be part of a separate system, such as a local system that communicates with the POS system 100 to determine the shopper's list of purchasers. As further shown in FIG. 2, the processor circuit 140 can be coupled to a remote processor circuit 155 via a network 145, such as the Internet.

Figure 3:
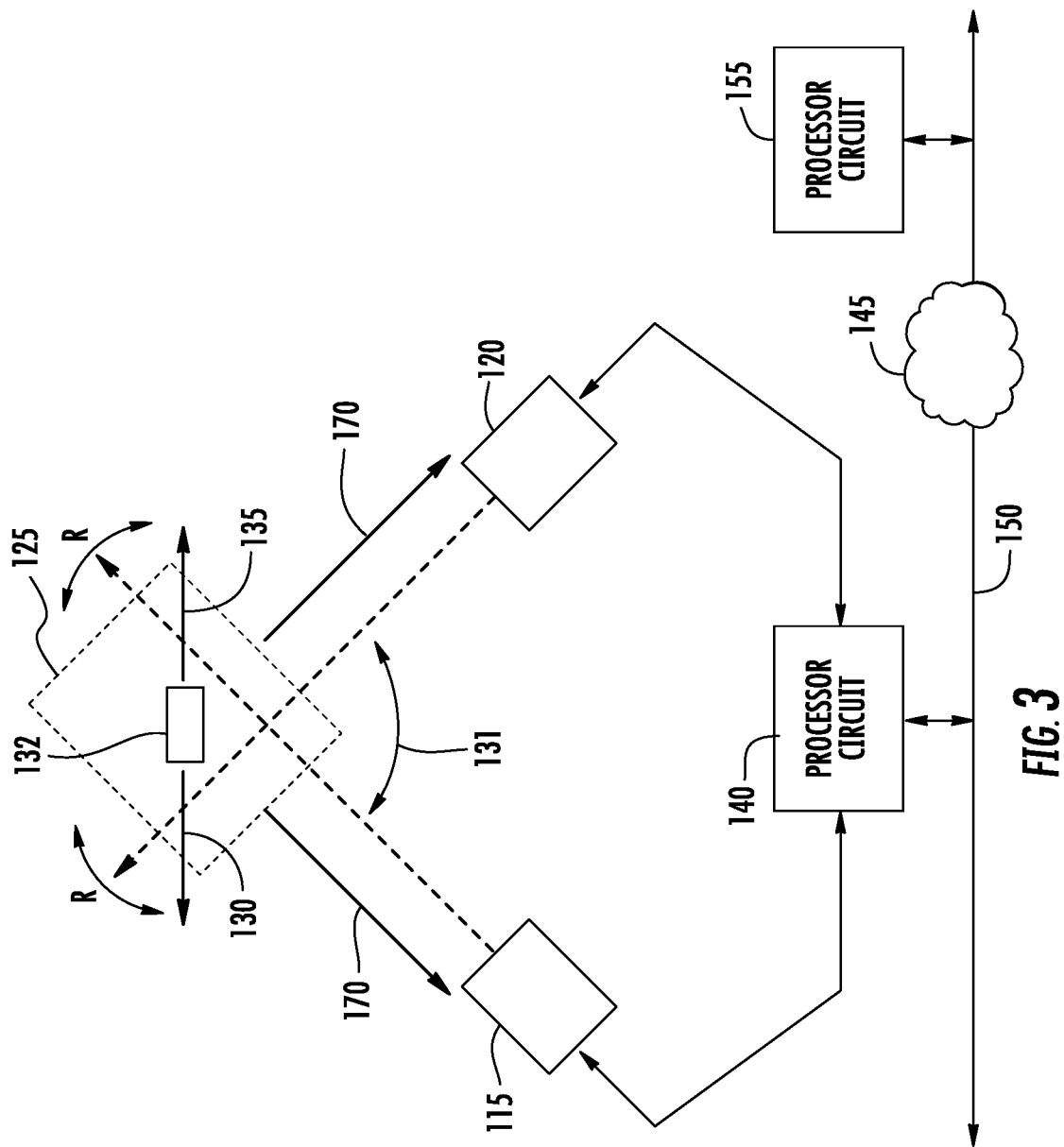
FIG. 3 is a schematic diagram of the POS system shown in FIG. 1 illustrating the orientations of one transmit/receive RFID tag reader and one receive-only RFID tag reader to define the buy-zone in which RFID tagged items can be moved for purchase in some embodiments according to the invention.

FIG. 3 is a schematic diagram of the POS system 100 shown in FIG. 1 illustrating the orientations of one transmit/receive RFID tag reader 120 and one receive-only RFID tag reader 115 to define the buy-zone in which RFID tagged items can be moved for purchase in some embodiments according to the invention. According to FIG. 3, the transmit/receive RFID tag reader 120 and the receive-only RFID tag reader 115 are oriented in different planes to form an angle 131 that is about 90 degrees in some embodiments. The RFID tagged items 132 can be moved in the direction 135 through the buy-zone 125 toward the bagging station 105 or away from the bagging station 105 in direction 130.

As further shown in FIG. 3 the RFID tag reader 120 has an associated radius R which is within the operational scanning range of the reader. In particular, the radius R is a distance within which if an RFID tag receives a read signal from the RFID tag reader 120, the RFID tagged item 132 will transmit a response to the read signal 175. The buy-zone 125 can be defined to include points in the respective three dimensional spaces that overlap another. It will be understood that even though points in space may be within scanning range R of the RFID tag reader, those points may not be included in the buy-zone 125.

In operation, the RFID tag reader 120 can transmit a read signal 175 which is received by the RFID tagged item 132 because it is within range R. After receiving the read signal 175, the RFIID tagged item 132 can respond by transmitting a response signal 170 back to the RFID tag reader 120. As further shown in FIG. 3, the response signal 170 is also received by the receive-only RFID tag reader 115.

The information associated with the response signal is transmitted to a processor circuit 140, which is configured to coordinate operations of the system 100. In particular, the processor circuit 140 is configured to determine whether the RFID tagged item 132 is located within the buy-zone 125 using the phase information derived from the response signal 175. If the processor circuit 140 determines that the RFID tagged item 132 is located within the buy-zone 125, the processor circuit can determine whether the RFID tagged item 132 is moving toward the bagging area 105 or away from the bagging area based on changes in the position of the RFID tagged item 132 over time. The processor circuit 140 can then update the list of purchased items for the shopper. The processor circuit 140 can be included in the POS system 100 or can be part of a separate system, such as a local system that communicates with the POS system 100 to determine the shopper's list of purchasers. As further shown in FIG. 3, the processor circuit 140 can be coupled to a remote processor circuit 155 via a network 145, such as the Internet.

Figure 4:
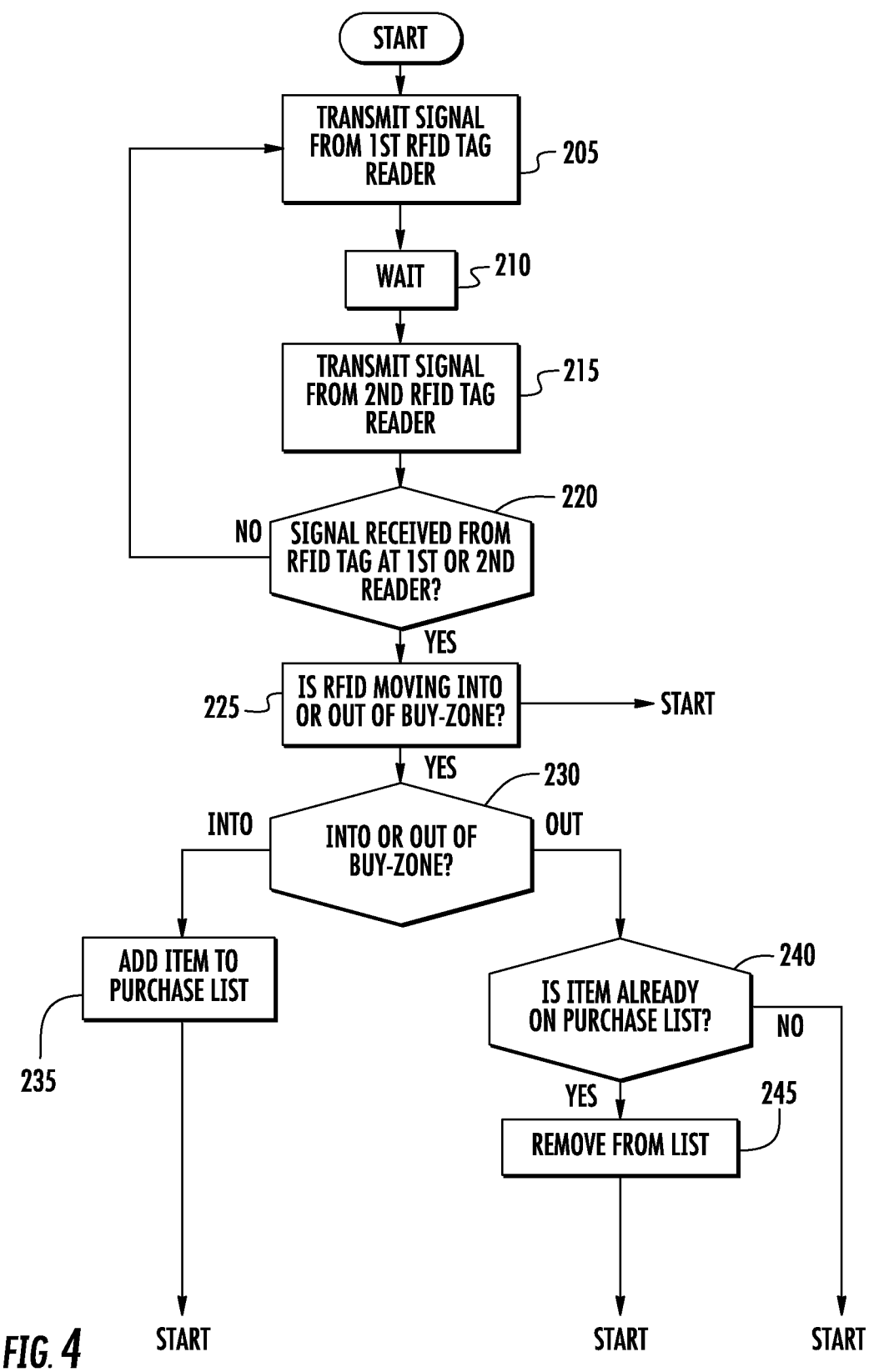
FIG. 4 is a flowchart illustrating operations of the POS system shown in FIG. 2 including alternating transmission of signals from the two transmit/receive RFID tag readers to the buy-zone to determine whether RFID tagged items are within the buy-zone for purchase in some embodiments according to the invention.

FIG. 4 is a flowchart illustrating operations of the POS system shown in FIG. 2 including alternating transmission of signals from the two transmit/receive RFID tag readers to the buy-zone to determine whether RFID tagged items are within the buy-zone for purchase in some embodiments according to the invention. As shown in FIG. 4, operations can begin where the first RFID tag reader transmits a read signal (block 205). A time interval is inserted to insure that a read signal transmitted by another RFID tag reader does not conflict with the read signal sent by the first RFID tag reader (block 210).

After the time interval, the second RFID tag reader transmits a read signal (block 215). It is then determined whether a signal is received from an RFID tagged item responsive to either of the two read signals transmitted by the first and second RFID tag readers (block 220). If no response is received operations continue at block 205 so as to continue monitoring for the receipt of a response. If, however a signal is received from an RFID tagged item responsive to either of the two read signals transmitted by the first and second RFID tag readers (block 220), a determination is made whether the RFID tag sending the response is moving through the buy-zone 125 either toward or away from the area designated for purchases (block 225).

If it is determined that the RFID tag sending the response is moving through the buy-zone 125 toward the area designated for purchases (block 225) the item is added to the list of items for purchase (block 235). If it is determined that the RFID tag sending the response is moving through the buy-zone 125 away from the area designated for purchases (block 225) the item may be removed from the list of items for purchase (block 245) if it is determined that the item is already included on the list of purchased items (block 240). Otherwise, the response may be ignored (block 240).

Figure 5:
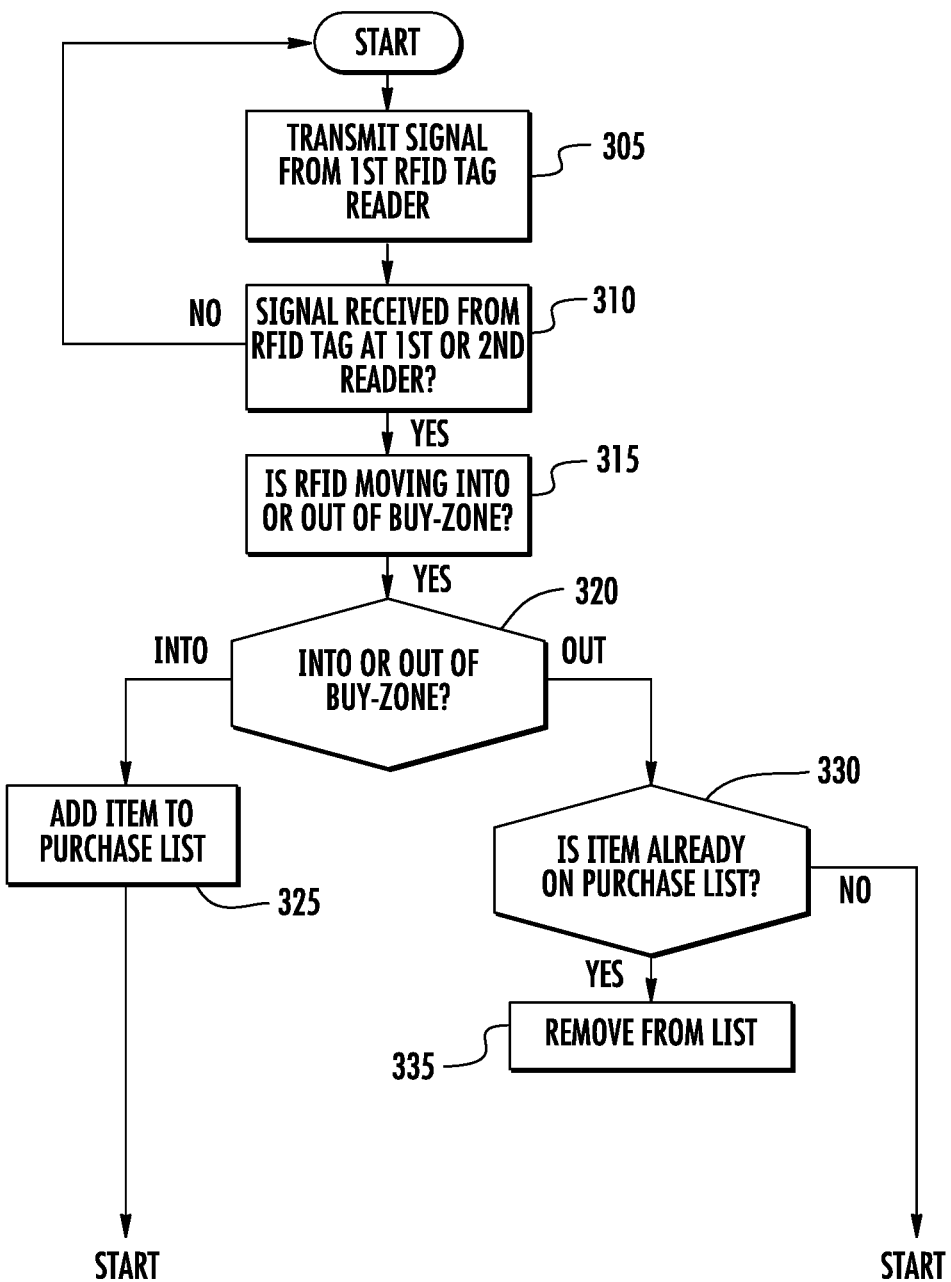
FIG. 5 is a flowchart illustrating operations of the POS system shown in FIG. 3 including transmission of signals from only one transmit/receive RFID tag reader to the buy-zone to determine whether RFID tagged items are within the buy-zone for purchase in some embodiments according to the invention.

FIG. 5 is a flowchart illustrating operations of the POS system shown in FIG. 3 including transmission of signals from only one transmit/receive RFID tag reader to the buy-zone to determine whether RFID tagged items are within the buy-zone 125 for purchase in some embodiments according to the invention. As shown in FIG. 5, operations can begin where the first RFID tag reader transmits a read signal (block 305). A determination is made whether a response to the read signal is received by either the first RFID tag reader or by the receive only RFID tag reader (block 310). If no response is received by either the first RFID tag reader or by the receive only RFID tag reader (block 310) operations continue at block 305 so as to continue monitoring for the receipt of a response.

If, however a signal is received from an RFID tagged item responsive to the read signal transmitted by the first RFID tag reader (block 310), a determination is made whether the RFID tag sending the response is moving through the buy-zone 125 either toward or away from the area designated for purchases (block 315). If it is determined that the RFID tag sending the response is moving through the buy-zone 125 toward the area designated for purchases (block 320) the item is added to the list of items for purchase (block 325). If it is determined that the RFID tag sending the response is moving through the buy-zone 125 away from the area designated for purchases (block 315) the item may be removed from the list of items for purchase (block 335) if it is determined that the item is already included on the list of purchased items (block 330). Otherwise, the response may be ignored.

Figure 6:
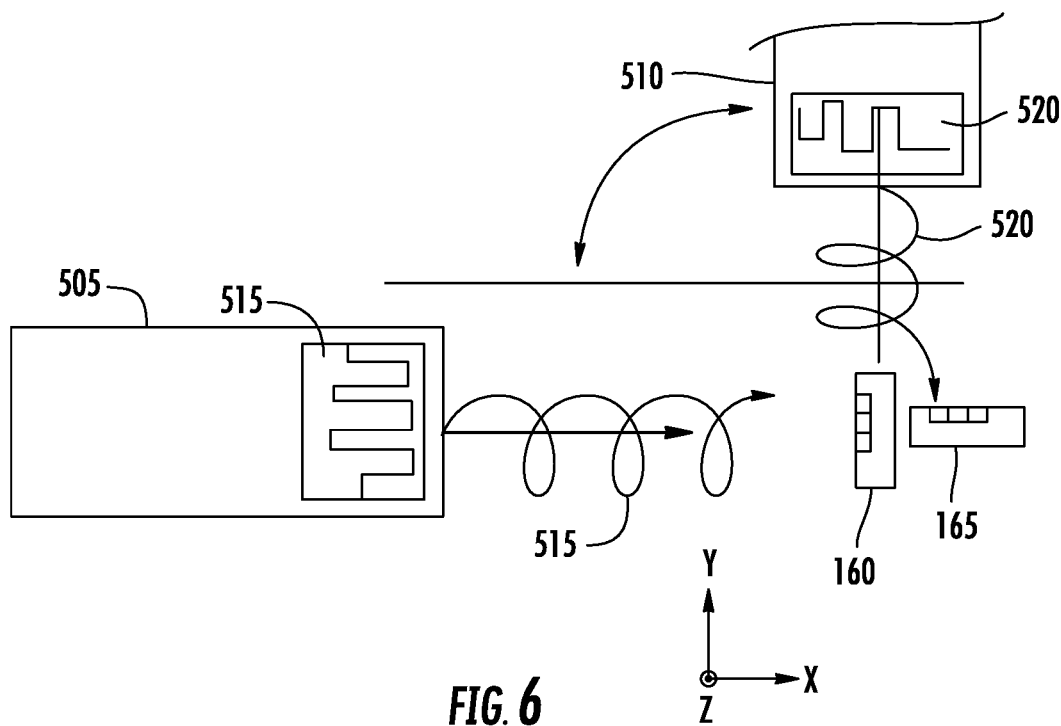
FIG. 6 is a schematic diagram illustrating first and second RFID tag reader antennas extending in respective first and second planes and an RFID tag antenna shown in different orientations in some embodiments according to the invention.

FIG. 6 is a schematic diagram illustrating first and second RFID tag reader antennas 505 and 510 extending on substrates in respective first and second planes and respective RFID tag antennas 515 and 520 shown in different orientations and including respective tag antennas in some embodiments according to the invention. According to FIG. 6, the RFID tag readers 505 and 510 are within range of RFID tags 160 and 165. The RFID tags 160 and 165 are oriented in different directions representing exemplary orientations of RFID tags that may be processed by the system 100. In particular, the RFID tags 160 and 165 are oriented such that both tags may not receive a read signal from at least one of the RFID tag readers 505 and 510. For example, RFID tag 160 is oriented such that it can receive a read signal from the RFID tag reader 505 and can respond by transmitting a signal that can be received by the tag reader 505. However, the tag 165 is oriented perpendicular relative to the first RFID tag reader 505 such that it may not receive a read signal or may send a response that is not received by the tag reader 505.

In contrast, RFID tag 165 is oriented such that it can receive a read signal from the second RFID tag reader 510 and can respond by transmitting a signal that can be received by the tag reader 510. However, the tag 165 is oriented perpendicular relative to the first RFID tag reader 505 such that it may not receive a read signal or may send a response that is not received by the tag reader 505. Accordingly, when both RFID tag readers are combined in the system 100, the dependency of communicating with RFID tags due orientation can be addressed by positioning at least two RFID tag readers in different intersecting planes adjacent to define a buy-zone through which tagged items can be moved for purchasing.

Figure 7A:
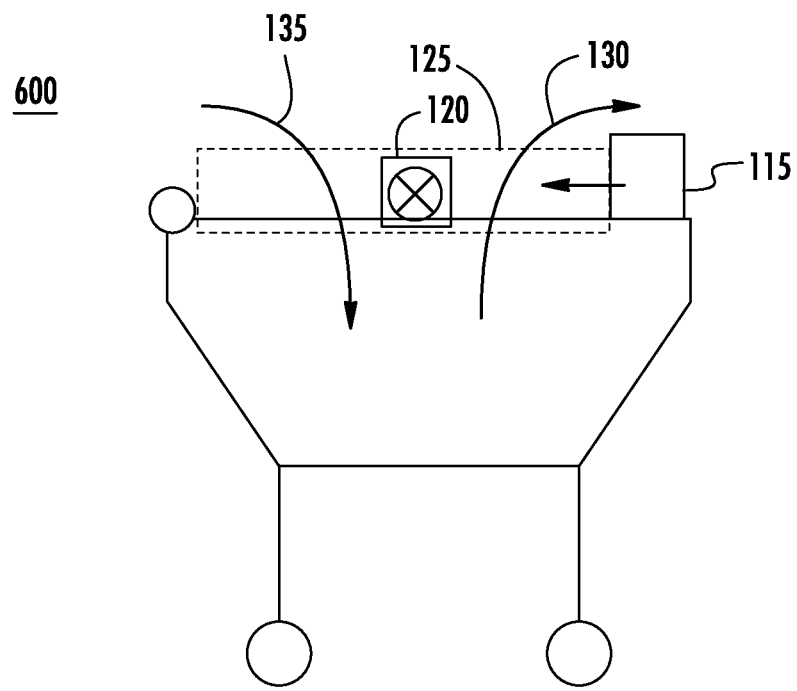
FIG. 7A is a side view of a wheeled shopping cart having first and second RFID tag readers coupled thereto to define the buy-zone adjacent to an opening in the shopping cart in some embodiments according to the invention.
Figure 7B:
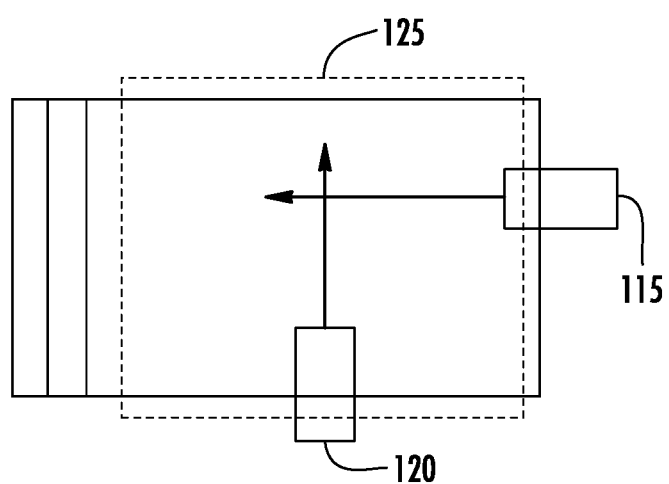
FIG. 7B is a top view of the wheeled shopping cart shown in FIG. 7A in some embodiments according to the invention.

FIG. 7A is a side view of a wheeled shopping cart 600 having first and second RFID tag readers 115 and 120 coupled thereto to define the buy-zone 125 adjacent to an opening in the shopping cart 600 in some embodiments according to the invention. FIG. 7B is a top view of the wheeled shopping cart shown in FIG. 7A in some embodiments according to the invention.

Figure 8A:
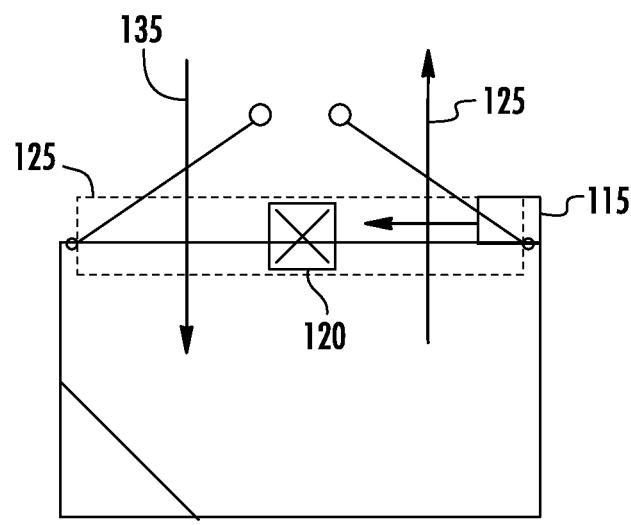
FIG. 8A is a side view of a hand-held shopping cart having first and second RFID tag readers coupled thereto to define the buy-zone adjacent to an opening in the shopping cart in some embodiments according to the invention.
Figure 8B:
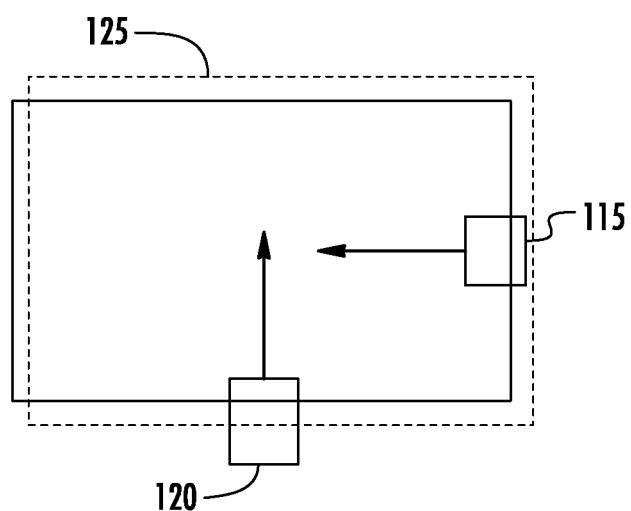
FIG. 8B is a side view of the hand-held shopping cart shown in FIG. 8A in some embodiments according to the invention.

FIG. 8A is a side view of a hand-held shopping cart 700 having first and second RFID tag readers 115 and 120 coupled thereto to define the buy-zone 125 adjacent to an opening in the shopping cart 700 in some embodiments according to the invention. FIG. 8B is a side view of the hand-held shopping cart shown in FIG. 8A in some embodiments according to the invention.

Figure 9:
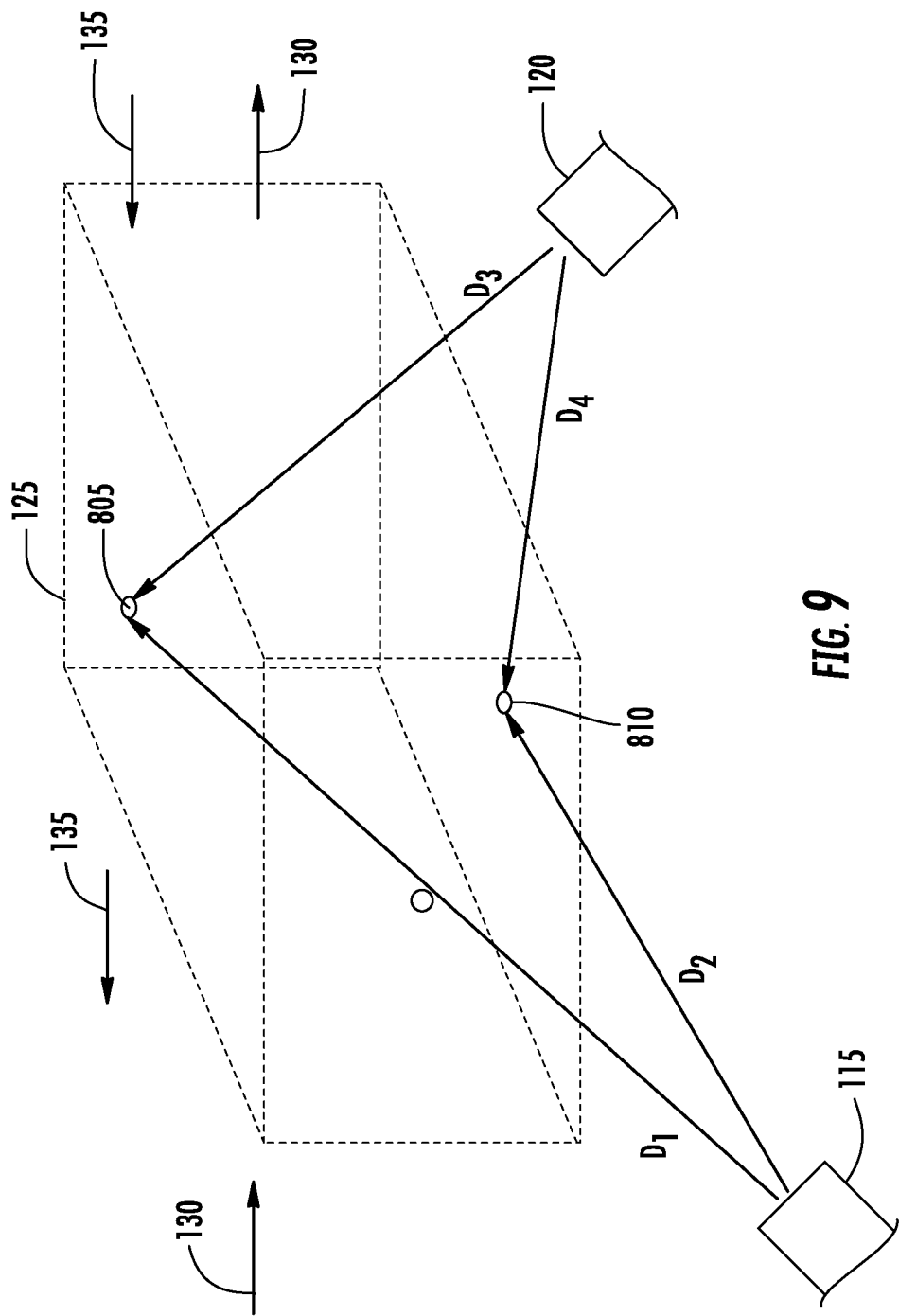
FIG. 9 is a schematic illustration using two RFID tag readers to monitor the buy-zone that includes any distance measured from the two RFID tag readers to points within a three dimensional space that is adjacent to an area designated to indicate the purchase of items in some embodiments according to the invention.

FIG. 9 is a schematic illustration using two RFID tag readers 115 and 120 to monitor the buy-zone 125 that includes any distance measured from the two RFID tag readers 115 and 120 to points 805 and 810 within a three dimensional space that is adjacent to an area designated to indicate the purchase of items in some embodiments according to the invention. According to FIG. 9, the point 805 is located within the three dimensional space representing the buy-zone 125. In particular, the point 805 is located distance D1 from the first RFID tag reader 115 and located distance D3 from the second RFID tag reader 120. Similarly, the point 810 is also located within the three dimensional space representing the buy-zone 125. In particular, the point 810 is located distance D2 from the first RFID tag reader 115 and located distance D4 from the second RFID tag reader 120. The distances are predetermined to be located within the buy-zone based on the location of the RFID tag readers 115, 120 and the desired location of the buy-zone 125. It will be understood that any tagged item that passed within range of the RFID tag readers 115 and 120 can be determined to be moving inside the buy zone based on the distance to one of the RFID tag readers (e.g., if the tag is mis-oriented relative to one of the RFID tag readers) and/or the distance to both of the RFID readers.

Figure 10:
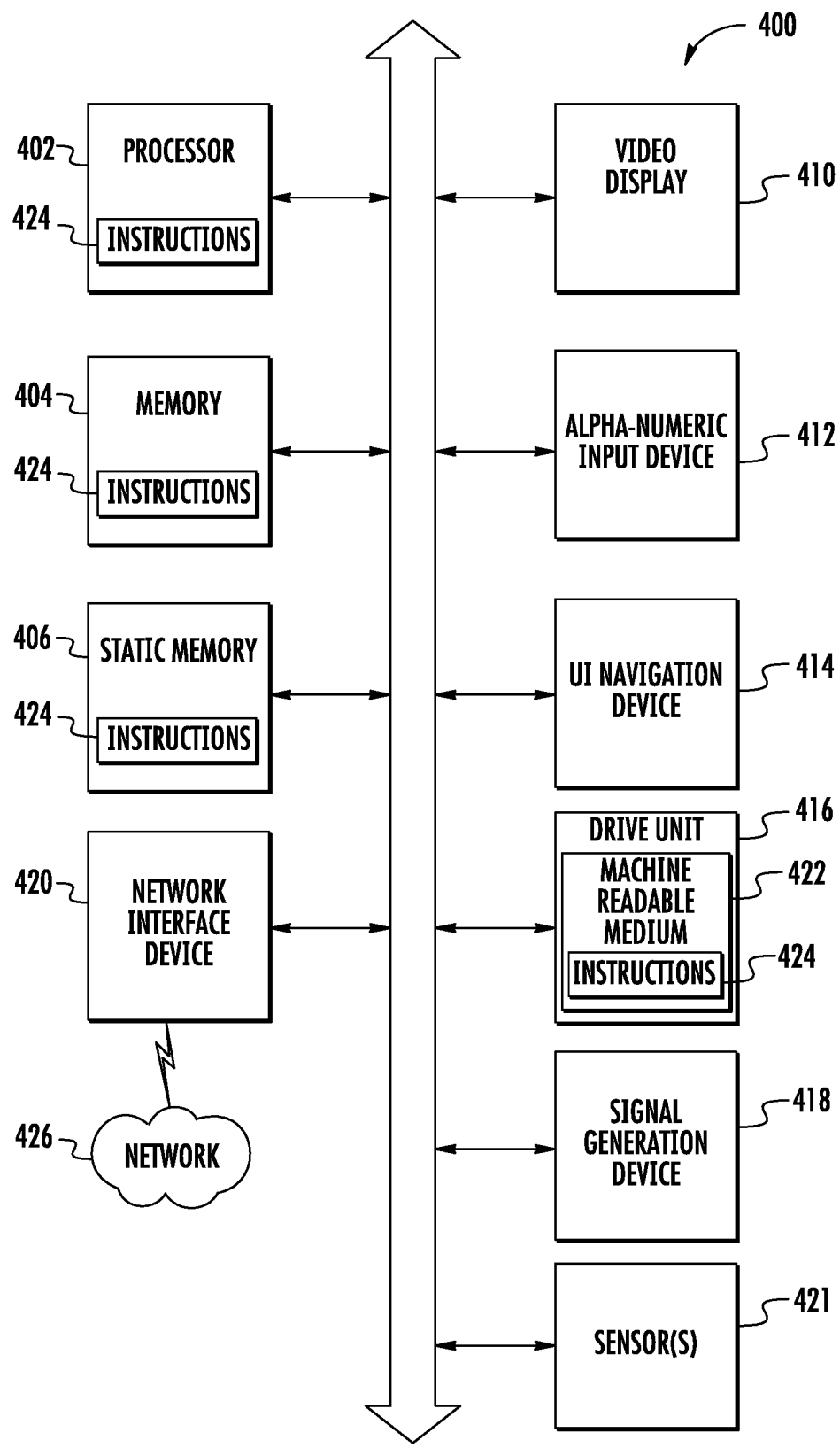
FIG. 10 is a block diagram of a computing system that can be used to perform processor-executable instructions represented by non-transitory processor-readable media to carry out the operations shown in FIGS. 1-9 in some embodiments according to the invention.

FIG. 10 is a block diagram illustrating an example of a machine upon which one or more aspects of embodiments of the present invention can be implemented. For example the block diagram of FIG. 10 illustrates a computing system that can be used to perform processor-executable instructions represented by non-transitory processor-readable media to carry out the operations shown in FIGS. 1-9 in some embodiments according to the invention.

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. An RFID in-store point-of-sale system comprising:
   a first RFID tag reader with a first reader antenna that extends on a first substrate oriented in a first plane;
   a second RFID tag reader with a second reader antenna that extends on a second substrate oriented in a second plane that intersects the first plane to form an offset angle between the first plane and the second plane that is about 45 degrees to about 135 degrees; and a processor circuit operatively coupled to the first RFID tag reader and to the second RFID tag reader and configured to control the first RFID tag reader to transmit a signal from the first reader antenna into a buy-zone and is configured to detect movement of an RFID tag relative to the buy-zone based on a signal from the RFID tag that is detected by the first RFID tag reader or that is detected by the second RFID tag reader.

2. The RFID in-store point-of-sale system of claim 1 wherein the buy-zone is defined to include any distance measured from the first reader antenna or from the second reader antenna to points within a defined three-dimensional space adjacent to an area designated to indicate purchase of items associated with the RFID tag.

3. The RFID in-store point-of-sale system of claim 1 wherein the second RFID tag reader is a RFID tag reader that does not transmit RFID signals to detect the movement of the RFID tag relative to the buy-zone;
the processor circuit is further configured to detect the movement of the RFID tag into the buy-zone or out of the buy-zone based on the signal from the RFID tag being detected by the first RFID tag reader or being detected by the receive-only RFID tag reader.

4. The RFID in-store point-of-sale system of claim 1 wherein the signal from the first reader antenna comprises a first signal from the first RFID tag reader and the signal from the RFID tag comprises a first signal from the RFID tag that is responsive to the first signal from the first RFID tag reader and the processor circuit is further configured to control the second RFID tag reader to transmit a second signal from the second reader antenna into the buy-zone;
wherein the processor circuit is further configured to detect movement of the RFID tag into the buy-zone or out of the buy-zone based on the first signal from the RFID tag being detected by the first RFID tag reader or based on a second signal from the RFID tag that is responsive to the second signal from the second RFID tag reader being detected by the second RFID tag reader.

5. The RFID in-store point-of-sale system of claim 4 wherein the processor circuit is further configured to time-offset generation of the first signal from the first RFID tag reader and generation of the second signal from the second RFID tag reader.

6. The RFID in-store point-of-sale system of claim 1 wherein the first reader antenna comprises a first circular polarized RFID antenna and the second reader antenna comprises a second circular polarized RFID antenna.

7. The RFID in-store point-of-sale system of claim 1 wherein the first RFID tag reader and the second RFID tag reader are located proximate to a bagging station.

8. The RFID in-store point-of-sale system of claim 1 wherein the first RFID tag reader and the second RFID tag reader are coupled to a mobile shopping receptacle and the buy-zone is located across an opening in mobile shopping receptacle sized to accommodate insertion of an item attached to the RFID tag.

9. The RFID in-store point-of-sale system of claim 8 wherein the mobile shopping receptacle is a wheeled shopping cart or a hand-held basket.

10. The RFID in-store point-of-sale system of claim 1 wherein the processor circuit is further configured to detect the movement of the RFID tag relative to the buy-zone based on phase change information associated with the signal from the RFID tag that indicates movement of the RFID tag.

11. The RFID in-store point-of-sale system of claim 1 wherein the processor circuit is further configured to indicate that an item associated with the RFID tag has been purchased responsive to detecting the movement of the RFID tag into the buy-zone and is further configured to indicate that the item associated with the RFID tag has not been purchased responsive to detecting the movement of the RFID tag out the buy-zone.

12. A method of operating an RFID in-store point-of-sale system, the method comprising:
(a) transmitting a first signal from a first RFID tag reader into a buy-zone via a first reader antenna that extends in a first plane;
(b) determining whether a first signal transmitted by an RFID tag moving relative to the buy-zone is received at the first RFID tag reader in response to the first signal transmitted from the first RFID tag reader;
(c) determining whether a second signal transmitted by the RFID tag moving relative to the buy-zone is received at a second RFID tag reader via a second reader antenna that extends in a second plane, the second plane intersecting the first plane to form an offset angle between the first plane and the second plane that is about 45 degrees to about 90 degrees;
repeating operations (a)-(c) until detecting a movement of the RFID tag into the buy-zone or out of the buy-zone based on receiving the first signal from the RFID tag or receiving the second signal from the RFID tag; and
indicating that an item associated with the RFID tag has been purchased or not been purchased responsive to detecting the movement of the RFID tag into the buy-zone or out of the buy-zone, respectively.

13. The method of claim 12 wherein the buy-zone is defined to include any distance measured from the first reader antenna or from the second reader antenna to points within a defined three-dimensional space adjacent to an area designated to indicate purchase of items associated with the RFID tag.

14. The method of claim 12 wherein the second signal transmitted by the RFID tag moving into or out of the buy-zone comprises the first signal transmitted by the RFID tag and the second RFID tag reader comprises a receive-only RFID tag reader.

15. The method of claim 12 further comprising:
(d) after operation (a) transmitting a second signal from the second RFID tag reader into the buy-zone via the second reader antenna before operation (c).

16. The method of claim 12 wherein the first reader antenna comprises a first circular polarized RFID antenna and the second reader antenna comprises a second circular polarized RFID antenna.

17. The method of claim 12 wherein the first RFID tag reader and the second RFID tag reader are located proximate to a bagging station.

18. The method of claim 12 wherein the first RFID tag reader and the second RFID tag reader are coupled to a mobile shopping receptacle and the buy-zone is located across an opening in mobile shopping receptacle sized to accommodate insertion of an item attached to the RFID tag.

19. One or more non-transitory processor-readable media storing processor-executable instructions for causing one or more processors to perform a method of operating a RFID in-store point-of-sale system, the method comprising:
(a) transmitting a first signal from a first RFID tag reader into a buy-zone via a first reader antenna that extends in a first plane;

(b) determining whether a first signal transmitted by an RFID tag moving relative to the buy-zone is received at the first RFID tag reader in response to the first signal transmitted from the first RFID tag reader;
(c) determining whether a second signal transmitted by the RFID tag moving relative to buy-zone is received at a second RFID tag reader via a second reader antenna that extends in a second plane, the second plane intersecting the first plane to form an offset angle between the first plane and the second plane that is about 45 degrees to about 90 degrees;
repeating operations (a)-(c) until detecting a movement of the RFID tag into the buy-zone or out of the buy-zone based on receiving the first signal from the RFID tag or receiving the second signal from the RFID tag; and
indicating that an item associated with the RFID tag has been purchased or has not been purchased responsive to detecting the movement of the RFID tag.

20. The one or more non-transitory processor-readable media storing processor-executable instructions according to claim 19 wherein the buy-zone is defined to include any distance measured from the first reader antenna or from the second reader antenna to points within a defined three-dimensional space adjacent to an area designated to indicate purchase of items associated with the RFID tag.

* * * * *

UNITED STATES PATENT AND TRADEMARK OFFICE
CERTIFICATE OF CORRECTION

| | |
|---|---|
| PATENT NO. | : 11,132,876 B1 |
| APPLICATION NO. | : 16/885829 |
| DATED | : September 28, 2021 |
| INVENTOR(S) | : Steiner et al. |

It is certified that error appears in the above-identified patent and that said Letters Patent is hereby corrected as shown below:

On the Title Page

(73) Assignee: Please correct "Toshiba Global Commerce Solutions Holdings Corporation" to read -- Toshiba Global Commerce Solutions Holdings Corporation (JP) --

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*